United States Patent [19]

Morisawa

[11] Patent Number: 4,774,689
[45] Date of Patent: Sep. 27, 1988

[54] DATA INPUT SYSTEM WITH POINTING DEVICE

[75] Inventor: Toshikazu Morisawa, Tokorozawa, Japan

[73] Assignee: Kabushiki Kaisha Toshiba, Kawasaki, Japan

[21] Appl. No.: 779,963

[22] Filed: Sep. 25, 1985

[30] Foreign Application Priority Data

Sep. 26, 1984 [JP] Japan .................. 59-201256

[51] Int. Cl.$^4$ ............................................. G06F 3/033
[52] U.S. Cl. .................................................. 364/900
[58] Field of Search ... 364/200 MS File, 900 MS File; 340/706, 707, 708, 709, 710, 711, 712

[56] References Cited

U.S. PATENT DOCUMENTS 3,887,903 6/1975 Martell .................. 364/200

FOREIGN PATENT DOCUMENTS 56-22128(A) 3/1981 Japan .
57-212543(A) 12/1982 Japan .

Primary Examiner—Thomas M. Heckler
Attorney, Agent, or Firm—Finnegan, Henderson, Farabow, Garrett & Dunner

[57] ABSTRACT

According to a data input system with a pointing device, a keyboard device is provided with a pointing device interface and a key code generator. The keyboard device incorporates a microprocessor for generating a key code corresponding to a depressed key. The key code generator assigns data input through the pointing device interface to a nondefined key code. The data from the pointing device having been assigned a nondefined key code, is supplied as a key code from the keyboard device to a keyboard interface in a data processing device. The data processing device checks a specific bit of the data supplied thereto and determines that the received data is data originally supplied from the pointing device.

3 Claims, 5 Drawing Sheets

FIG. 5A HC
FIG. 5B A
FIG. 5C B
FIG. 5D COUNT

FIG. 6A

| b7 | b6 | b5 | b4 | b3 | b2 | b1 | b0 |
|----|----|----|----|----|----|----|----|
| 1 | 1 | 1 | 1 | \multicolumn{4}{c}{$X_A$} |

FIG. 6B

| b7 | b6 | b5 | b4 | b3 | b2 | b1 | b0 |
|----|----|----|----|----|----|----|----|
| 1 | 1 | 1 | 1 | \multicolumn{4}{c}{$X_B$} |

FIG. 6C

| b7 | b6 | b5 | b4 | b3 | b2 | b1 | b0 |
|----|----|----|----|----|----|----|----|
| 1 | 1 | 1 | 1 | \multicolumn{4}{c}{$Y_A$} |

FIG. 6D

| b7 | b6 | b5 | b4 | b3 | b2 | b1 | b0 |
|----|----|----|----|----|----|----|----|
| 1 | 1 | 1 | 1 | \multicolumn{4}{c}{$Y_B$} |

DATA INPUT SYSTEM WITH POINTING DEVICE

BACKGROUND OF THE INVENTION

The present invention relates to a data input system with a pointing device.

Various types of pointing devices such as mouses and track balls have been developed as input mechanisms in data processing systems. Conventional data processing systems incorporate input interfaces for receiving data from these pointing devices.

In a conventional system, I/O (input and output) device addresses must be assigned for the pointing device and the system design requires modification.

SUMMARY OF THE INVENTION

It is an object of the present invention to provide a data input system for a pointing device, wherein data from the pointing device can be easily entered in a main unit through an existing interface mechanism such as a keyboard interface.

In order to achieve the above object of the present invention, there is provided a pointing device data input system having a pointing device for designating a two-dimensional coordinate point on a display screen, a keyboard device having a key code generator for generating a key code corresponding to each one of the keys constituting a key matrix, and a data processing device connected to the keyboard device through a keyboard interface, comprising: pointing device interface means, arranged in the keyboard device, for connecting the pointing device and the keyboard device; and pointing device key code generating means, arranged in the keyboard device, for assigning a nondefined key code to data entered from the pointing device and supplying the input data to the data processing device as a defined key code from the keyboard device.

According to the present invention, data sent to the pointing device interface from the pointing device is assigned to a nondefined key code of the keyboard device. Therefore, the data processing device can receive the input data as a key code from the keyboard device, and thus no pointing device I/O addresses need be allocated. In addition, compatibility with existing software can be guaranteed.

BRIEF DESCRIPTION OF THE DRAWINGS

Other objects and features of the present invention will be apparent from the following description taken in connection with the accompanying drawings, in which:

FIGS. 5A through 5D are respectively timing charts for explaining the operation of the counter shown in FIG. 3; and FIGS. 6A through 6D are respectively timing charts of data supplied from a pointing device to a keyboard interface in a data processing device by using nondefined key codes of the keyboard device, in which FIGS. 6A and 6B show x-coordinate data and FIGS. 6C and 6D show y-coordinate data.

DETAILED DESCRIPTION OF THE PREFERRED EMBODIMENT

Figure 1:
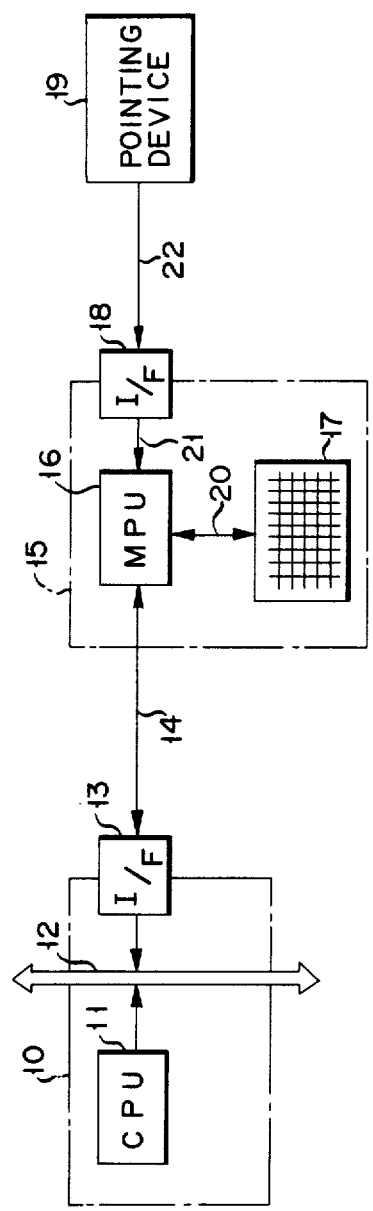
FIG. 1 is a block diagram of a data input system according to an embodiment of the present invention.

FIG. 1 is a block diagram of a data input system according to an embodiment of the present invention. Referring to FIG. 1, a data processing device 10 has a central processing unit (CPU) 11 and a keyboard interface 13 connected to the CPU 11 through a bus 12. The device 10 is connected to a keyboard device 15 through a signal line 14. The device 15 comprises key switches 17 constituting a key matrix connected to a miroprocessor unit (MPU) 16 (to be described in detail later) through a line 20, the MPU 16 for transferring key input data from the switches 17 and data from the device 19 to the keyboard interface 13 through the line 14, and a pointing device interface 18 connected to the MPU 16 through a line 21 to interface between the device 19 and the MPU 16. The device 19 comprises a mouse or a track ball which is connected to the device 18 through a line 22.

Figure 2:
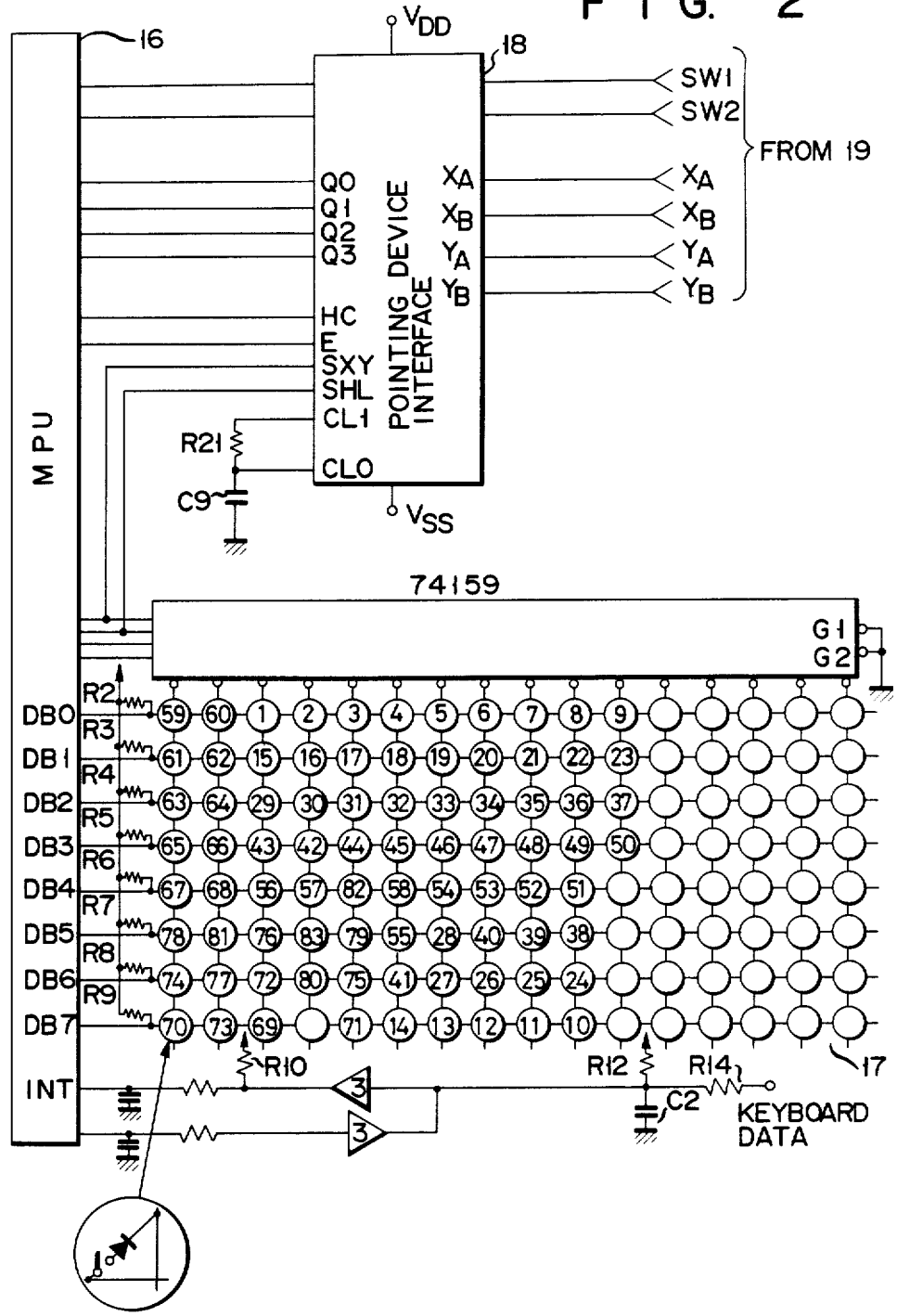
FIG. 2 is a detailed block diagram of a keyboard shown in FIG. 1.

FIG. 2 is a detailed block diagram of the keyboard device shown in FIG. 1. Referring to FIG. 2, reference symbols XA and XB are x-coordinate pulses supplied from the device 19, respectively. When the pulse XA is added to the pulse XB, an x coordinate can take a value within the range of $-128 \leq X \leq +128$. Similarly, reference numerals YA and YB denote y-coordinate pulses supplied from the device 19. When the pulse YA is added to the pulse YB, the y coordinate can take a value within the range of $-128 \leq Y \leq +128$. A pulse signal SW1 is a select signal for selecting a point currently indicated by the cursor. A pulse signal SW2 is a reset signal for resetting the point currently indicated by the cursor.

Figure 3:
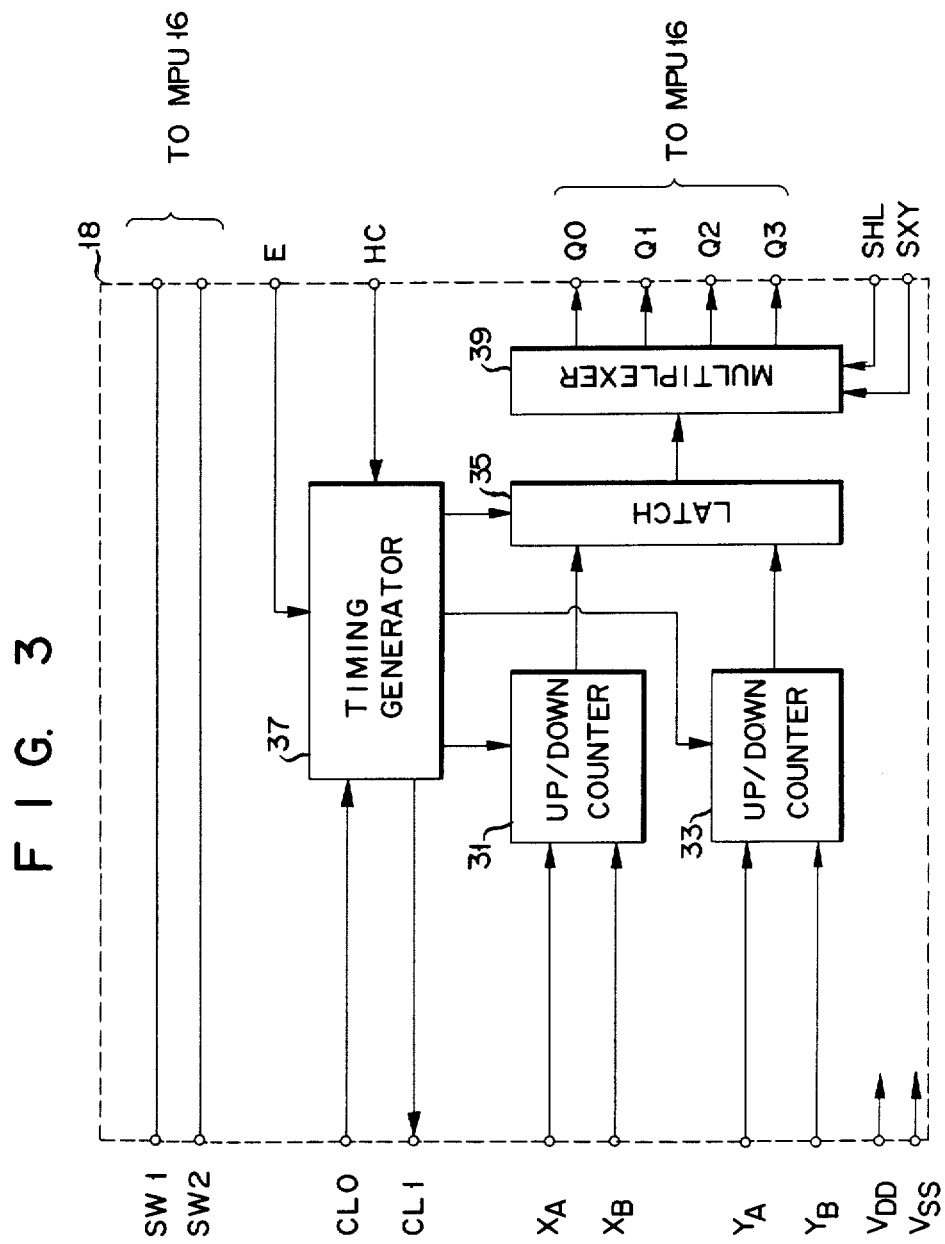
FIG. 3 is a detailed block diagram of a pointing device interface shown in FIG. 2.

FIG. 3 is a detailed block diagram of the pointing device interface 18 shown in FIG. 2. The interface 18 comprises an x-coordinate 8-bit up/down counter (X) 31, a y-coordinate 8-bit up/down counter (Y) 33, a latch 35 for latching count outputs from the counters 31 and 33, a timing generator 37 for supplying timing signals to the counters 31 and 33 and the latch 35, and a multiplexer 39 for selecting x- and y-coordinate data generated from the latch 35. The counters 31 and 33 count pulses from the pointing device in accordance with the count conditions shown in FIG. 4.

Figure 4:
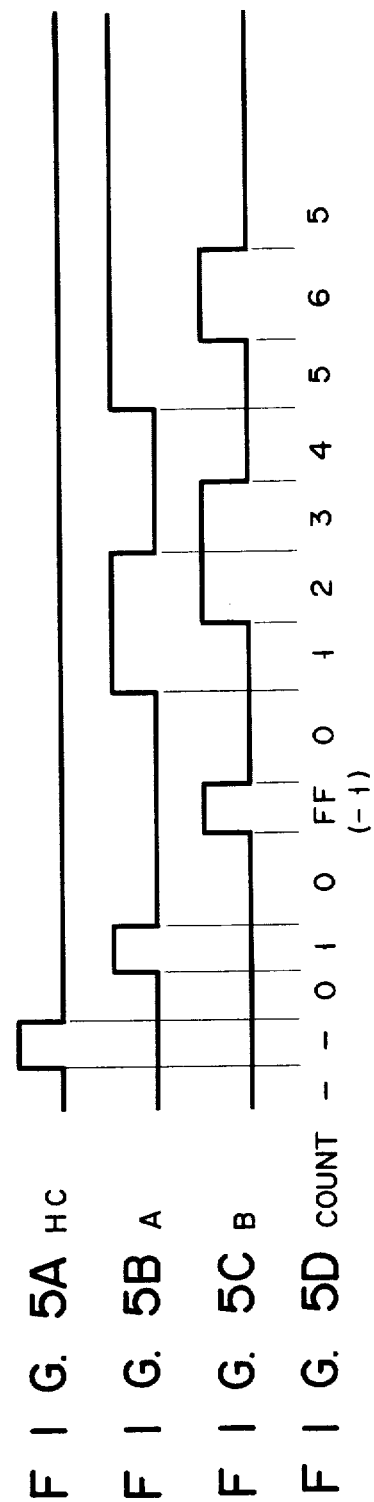
FIG. 4 is a table for explaining the count conditions of a counter shown in FIG. 3.

Referring to FIG. 4, arrows ↑ represent leading edges of the pulses, and arrows ↓ represent trailing edges thereof, respectively. As shown in the count conditions of FIG. 4 and the timing charts of FIGS. 5B and 5C, the count-up conditions are given as follows:

(i) Count-up is performed at the trailing edge of the pulse B when the pulse A is set at the low level.

(ii) Count-up is performed at the leading edge of the pulse A when the pulse B is set at the low level.

(iii) Count-up is performed at the leading edge of the pulse B when the pulse A is set at the high level.

(iv) Count-up is performed at the trailing edge of the pulse A when the pulse B is set at the high level.

Count-down conditions of the counters are given as follows:

(i) Count-down is performed at the leading edge of the pulse B when the pulse A is set at the low level.

(ii) Count-down is performed at the leading edge of the pulse A when the pulse B is set at the high level.

(iii) Count-down is performed at the trailing edge of the pulse B when the pulse A is set at the high level.

(iv) Count-down is performed at the trailing edge of the pulse A when the pulse B is set at the low level.

The count signals from the counters 31 and 33 are latched by the latch 35. The x- and y-coordinate count values latched by the latch 35 are supplied to the multiplexer 39 in response to timing signals from the generator 37. The multiplexer 39 receives the SXY and SHL signals as control signals. The SXY signal causes the multiplexer 39 to select x- or y-coordinate data. The SHL signal causes the multiplexer 39 to select upper or lower 4 bits of the x- or y-coordinate data. The multiplexer 39 generates corresponding four bit data Q0 through Q3. The output data format is illustrated in FIGS. 6A through 6D wherein all "1"s are set in the 5 upper four bits. The four bit data Q0 through Q3 from the multiplexer 39 are set in the lower four bits. FIG. 6A shows the upper 4-bit data XA of the x-coordinate data (8 bits), FIG. 6B shows lower 4-bit data XB of the x-coordinate data (8 bits), FIG. 6C shows upper 4-bit data YA of the y-coordinate data (8 bits), and FIG. 6D shows lower 4-bit data YB of the y-coordinate data (8 bits).

The MPU 16 in the keyboard device 15 sequentially receives these data which are then transmitted to the CPU 11 through the line 14 and the interface 13 of the device 10. In this case, a communication protocol complies with RS-232C standards. The order of transmission of each four bits shown in FIGS. 6A through 6D from the MPU 16 to the CPU 11 is predetermined by firmware. When the 4-bit data XA, XB, YA and YB shown in FIGS. 6A through 6D are assigned to nondefined codes, 16 nondefined codes are prepared.

A signal E supplied to the generator 37 is an enable signal of the counters 31 and 33. A signal HC is a signal for causing the counters 31 and 33 to hold count signals of the counters 31 and 33 and to reset them.

The operation of the data input system having the arrangement described above will be described hereinafter. When a key is depressed on the key matrix 17 in the device 15, the MPU 16 supplies a corresponding key code to the interface 13 through the line 14. The interface 13 sends the key code from the MPU 16 onto the CPU bus 12. As a result, the CPU 11 fetches the key code from the bus 12 and performs predetermined processing.

On the other hand, x-coordinate pulse data XA and XB and y-coordinate pulse data YA and YB from the device 19 are supplied to the x-coordinate up/down counter 31 and the y-coordinate up/down counter 33, respectively. The counters 31 and 33 perform counting in accordance with the count conditions of FIG. 4 and the timing charts of FIGS. 5A through 5D. The count signals from the counters 31 and 33 are supplied to the latch 35. After the latch 35 holds these count signals, the signals are supplied to the multiplexer 39 in response to timing signals from the generator 37. The multiplexer 39 supplies the x- or y-coordinate upper or lower 4-bit data to the MPU 16 in response to the SHL and SXY signals. The MPU 16 sequentially fetches the data from the multiplexer 39 and assigns the nondefined key codes of the keyboard in accordance with the data format shown in FIGS. 6A through 6D. The data from the pointing device 19 is supplied as a key code obtained by assigning a nondefined key code to the pointing device input data to the interface 13. The interface 13 sends the received data onto the CPU bus 12. The CPU 11 fetches the data from the CPU bus 12, thereby determining that the received data is from the device 19 since the upper four bits are set at all "1"s.

What is claimed is:

1. A pointing device data input system having a pointing device for designating a two-dimensional coordinate point on a display screen, a keyboard device having a key code generator for generating a key code corresponding to each one of keys constituting a key matrix, and a data processing device connected to said keyboard device through a keyboard interface, said keyboard device comprising:

pointing device interface means, arranged in said keyboard device, for connecting said pointing device and said keyboard device; and pointing device key code generating means for receiving, through said pointing device interface means, data from said pointing device, assigning the received data to a nondefined key code, and for outputting the nondefined key code to said data processing device as a defined key code from said keyboard device.

2. A system according to claim 1, wherein said pointing device key code generating means outputs x- and y-coordinate selection signals and a bit selection signal to said pointing device interface means, and said pointing device interface means comprises:

counters for counting x- and y-coordinate pulses from said pointing device; and a multiplexer for generating corresponding coordinate data in accordance with x- and y-coordinate selection signals and the bit selection signal supplied from said pointing device key code generating means.

3. A system according to claim 1, wherein the key code supplied to said data processing device has a bit representing that the key code is derived from the data from said pointing device.

* * * * *